United States Patent
Laselva et al.

(10) Patent No.: US 12,452,790 B2
(45) Date of Patent: *Oct. 21, 2025

(54) STATIONARITY-BASED UE POWER SAVING

(71) Applicant: Nokia Technologies Oy, Espoo (FI)

(72) Inventors: Daniela Laselva, Klarup (DK); Frank Frederiksen, Klarup (DK); Mads Lauridsen, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/631,572

(22) Filed: Apr. 10, 2024

(65) Prior Publication Data

US 2024/0259947 A1 Aug. 1, 2024

Related U.S. Application Data

(63) Continuation of application No. 17/430,751, filed as application No. PCT/EP2019/053715 on Feb. 14, 2019, now Pat. No. 11,968,625.

(51) Int. Cl.
*H04W 52/02* (2009.01)
*H04W 24/08* (2009.01)

(52) U.S. Cl.
CPC ....... *H04W 52/0254* (2013.01); *H04W 24/08* (2013.01)

(58) Field of Classification Search
CPC ................... H04W 24/08; H04W 52/0254
(Continued)

(56) References Cited

U.S. PATENT DOCUMENTS 6,970,708 B1 11/2005 Raith ............................ 455/440
11,968,625 B2* 4/2024 Laselva ................. H04W 24/08
(Continued)

FOREIGN PATENT DOCUMENTS

CN 102612119 A 7/2012
CN 107852631 A 3/2018
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 v15.3.0, (Sep. 2018), 918 pages.
(Continued)

*Primary Examiner* — Christopher R Crompton
(74) *Attorney, Agent, or Firm* — ALSTON & BIRD LLP

(57) ABSTRACT

There are provided measures for enabling/realizing stationarity-based UE power saving, specifically network-assisted power saving at a terminal entity based on local stationarity monitoring and autonomous power saving mode switching. Such measures exemplarily comprise that a terminal entity operates in a normal power mode, including performing normal radio environment related measurements (such as regular radio resource management measurements and/or cell search measurements) and monitoring a stationarity condition by means of local procedure and/or equipment, switches from the normal power mode to a power saving mode, if the locally monitored stationarity condition is satisfied, and operates in the power saving mode, including performing relaxed radio environment related measurements (such as relaxed radio resource management measurements and/or cell search measurements).

35 Claims, 6 Drawing Sheets

(58) Field of Classification Search
USPC .......................................................... 370/252
See application file for complete search history.

(56) References Cited

U.S. PATENT DOCUMENTS

| | | | |
|---|---|---|---|
| 2008/0008313 A1* | 1/2008 | Fyke ................. | H04W 52/0254 379/433.01 |
| 2008/0132225 A1 | 6/2008 | Ranta et al. | |
| 2008/0240006 A1* | 10/2008 | Tseng ................ | H04W 52/0225 370/310 |
| 2009/0164813 A1* | 6/2009 | Tu ..................... | H04W 52/0241 713/320 |
| 2013/0301499 A1 | 11/2013 | Jain et al. | |
| 2013/0343252 A1 | 12/2013 | Chakraborty et al. | |
| 2015/0327168 A1 | 11/2015 | Yllasjarvi et al. ............... 52/209 | |
| 2016/0302153 A1 | 10/2016 | Martin et al. | |
| 2017/0013674 A1 | 1/2017 | Soldati | |
| 2018/0332532 A1 | 11/2018 | Johansson et al. | |

FOREIGN PATENT DOCUMENTS

| | | |
|---|---|---|
| CN | 109257956 A | 1/2019 |
| WO | WO-2017/189131 A1 | 11/2017 |

OTHER PUBLICATIONS

"3rd Generation Partnership Project; Technical Specification Group Radio Access Network; NR; Physical layer measurements (Release 15)", 3GPP TS 38.215 v15.4.0, (Dec. 2018), 15 pages.
"3rd Generation Partnership Project; Technical Specification Group Radio Access Network; NR; Radio Resource Control (RRC) protocol specification (Release 15)", 3GPP TS 38.331 v15.4.0, (Dec. 2018), 474 pages.
"3rd Generation Partnership Project; Technical Specification Group Radio Access Network; NR; Requirements for support of radio resource management (Release 15)", 3GPP TS 38.133 v15.4.0, (Dec. 2018), 876 pages.
"3rd Generation Partnership Project; Technical Specification Group Radio Access Network; NR; Study on UE Power Saving (Release 16)", 3GPP TR 38.840 v0.1.0, (Nov. 2018), 24 pages.
Catt et al., "New SID: Study on UE Power Saving in NR", 3GPP TSG RAN Meetings #80, RP-181463, (Jun. 11-14, 2018), 5 pages.
Catt, "RRM measurement on power saving", 3GPP TSG RAN WG1 Ad-Hoc Meeting 1901, R1-1900346, (Jan. 21-25, 2019), 9 pages.
Ericsson, "RRM aspects of NR UE power saving", 3GPP TSG-RAN WG1 Meeting AH-1901, R1-1901168, (Jan. 21-25, 2019), 8 pages.
First Examination Report for Indian Application No. 202147040863 dated Mar. 4, 2022, 6 pages.
Intel Corporation, "On RRM aspects of NR UE power saving", 3GPP TSG-RAN WG1 Ad-Hoc Meeting 1901, R1-1900510, (Jan. 21-25, 2019), 3 pages.
International Search Report and Written Opinion for Patent Cooperation Treaty Application No. PCT/EP2019/053715 dated Aug. 21, 2019, 13 pages.
LG Electronics, "Discussion on UE power consumption reduction in RRM measurements", 3GPP TSG RAN WG1 Ad-Hoc Meeting 1901, R1-1900601, (Jan. 21-25, 2019), 3 pages.
NTT Docomo, Inc., "Discussion on UE power Consumption Reduction in RRM Measurements", 3GPP TSG RAN WG1 Ad-Hoc Meeting 1901, R1-1900982, (Jan. 21-25, 2019), 4 pages.
Office Action for Chinese Application No. 201980075285.6 dated Mar. 28, 2024, 12 pages.
Office Action for Chinese Application No. 201980075285.6 dated Sep. 26, 2023, 15 pages.
Office Action for Chinese Application No. 201980075285.6 dated Sep. 9, 2024, 11 pages.
Office Action for European Application No. 19705748.2 dated Mar. 13, 2024, 4 pages.

\* cited by examiner

STATIONARITY-BASED UE POWER SAVING

CROSS REFERENCE TO RELATED APPLICATION

This application is a continuation application of U.S. Ser. No. 17/430,751, filed Aug. 13, 2021, which is a U.S. National Stage application of International Patent Application Number PCT/EP2019/053715, filed Feb. 14, 2019, both of which are hereby incorporated by reference in their entireties.

FIELD

The present disclosure relates to stationarity-based UE power saving. More specifically, the present disclosure relates to measures/mechanisms (including methods, apparatuses (i.e. devices and/or functions) and computer program products) for enabling/realizing stationarity-based UE power saving.

BACKGROUND

Basically, the present disclosure addresses power saving or, stated in other words, reduction of energy/power consumption of terminal entities, such as UEs, in mobile communication systems. As an example, the present disclosure is applicable in a 3GPP-standardized communication system, such as a 5G/NR or a 4G/LTE/eLTE/LTE-A system.

For mobile devices or terminal entities being battery-powered, power saving is a vital issue. But also for other terminal entities, which are powered by an external power source, power saving is an issue from an ecological or environmental perspective. Accordingly, power saving techniques, including those of the present disclosure, are generally useful and applicable for all kind of devices or entities.

For example, in 5G/NR standardization, various approaches are studied for implementing a more energy/power-efficient UE when operating in any RRC state (Connected, Idle or Inactive). In this regard, there is a study item "Study on UE Power Saving in NR", in which on one of the objectives relates to UE power consumption reduction in RRM measurements in synchronous and asynchronous network deployment.

Although new synchronization signals for initial access and mobility are designed in 5G/NR to provide more flexibility and better trade-off between system performance and UE power consumption for measurement, RRM measurements will still consume unnecessary UE power. It is well-known that the UE energy/power consumption is a function (among others) of the number of searched and measured cells subject to RRM measurements. Therefore, one of the directions of this study item is to enable UE power consumption reduction on RRM radio measurements avoiding unnecessary measurements.

It is to be noted that RRM measurements represent an example of measurements related to the radio environment of a terminal entity, which consume energy/power of the terminal entity. Other examples of such energy/power-consuming measurements related to the radio environment of a terminal entity encompass cell search measurement, or the like.

Accordingly, there is a desire for efficient UE power saving in the context of measurements related to the radio environment, specifically for avoiding unnecessary measurements and/or alleviating necessary measurement.

SUMMARY

Various exemplifying embodiments of the present disclosure aim at addressing at least part of the above issues and/or problems and drawbacks.

Various aspects of exemplifying embodiments of the present disclosure are set out in the appended claims.

According to an example aspect of the present disclosure, there is provided a method comprising operating in a normal power mode, including performing normal radio environment related measurements and monitoring a stationarity condition by means of local procedure and/or equipment, switching from the normal power mode to a power saving mode, if the locally monitored stationarity condition is satisfied, and operating in the power saving mode, including performing relaxed radio environment related measurements.

According to an example aspect of the present disclosure, there is provided a method comprising obtaining capability information for monitoring stationarity condition and non-stationarity conditions from a terminal entity, setting configuration information for configuring non-/stationarity condition monitoring, by which switching between a normal power mode and a power saving mode at the terminal entity is controlled, and/or radio environment related measurement relaxation, by which radio environment related measurements performed in the power saving mode are relaxed as compared with radio environment related measurements performed in the normal power mode at the terminal entity, and notifying the configuration information to the terminal entity.

According to an example aspect of the present disclosure, there is provided an apparatus comprising at least one processor and at least one memory including a computer program code, wherein the at least one memory and the computer program code are configured, with the at least one processor, to cause the apparatus to perform at least the following: operating in a normal power mode, including performing normal radio environment related measurements and monitoring a stationarity condition by means of local procedure and/or equipment, switching from the normal power mode to a power saving mode, if the locally monitored stationarity condition is satisfied, and operating in the power saving mode, including performing relaxed radio environment related measurements.

According to an example aspect of the present disclosure, there is provided an apparatus comprising at least one processor and at least one memory including a computer program code, wherein the at least one memory and the computer program code are configured, with the at least one processor, to cause the apparatus to perform at least the following: obtaining capability information for monitoring stationarity condition and non-stationarity conditions from a terminal entity, setting configuration information for configuring non-/stationarity condition monitoring, by which switching between a normal power mode and a power saving mode at the terminal entity is controlled, and/or radio environment related measurement relaxation, by which radio environment related measurements performed in the power saving mode are relaxed as compared with radio environment related measurements performed in the normal power mode at the terminal entity, and notifying the configuration information to the terminal entity.

According to an example aspect of the present disclosure, there is provided an apparatus comprising means for operating in a normal power mode, including performing normal radio environment related measurements and monitoring a stationarity condition by means of local procedure and/or equipment, means for switching from the normal power mode to a power saving mode, if the locally monitored stationarity condition is satisfied, and means for operating in the power saving mode, including performing relaxed radio environment related measurements.

According to an example aspect of the present disclosure, there is provided an apparatus comprising means for obtaining capability information for monitoring stationarity condition and non-stationarity conditions from a terminal entity, means for setting configuration information for configuring non-/stationarity condition monitoring, by which switching between a normal power mode and a power saving mode at the terminal entity is controlled, and/or radio environment related measurement relaxation, by which radio environment related measurements performed in the power saving mode are relaxed as compared with radio environment related measurements performed in the normal power mode at the terminal entity, and means for notifying the configuration information to the terminal entity.

According to various developments/modifications, one or more of the following may apply for any one of the aforementioned method-related and/or apparatus-related example aspects of the present disclosure:

- operating in the power saving mode may further include monitoring a non-stationarity condition by means of local procedure and/or equipment,
- the method or apparatus functionality may further comprise switching from the power saving mode to the normal power mode, if the locally monitored non-stationarity condition is satisfied,
- the stationarity condition may be satisfied when monitoring, for a predetermined time period, one of: absence of motion of the terminal entity, and absence of motion of the terminal entity and non-variation of radio environment and/or operating status of the terminal entity,
- the predetermined time period for monitoring the stationarity condition may be set by network-assisted configuration,
- the predetermined time period for monitoring the stationarity condition may be set depending on a location of the terminal entity and/or a radio resource control state of the terminal entity and/or a daytime-related operating mode of the terminal entity,
- the non-stationarity condition may be satisfied when monitoring one of: presence of motion of the terminal entity, and variation of radio environment and/or operating status of the terminal entity,
- the stationarity condition and/or the non-stationarity condition being monitored may be set by network-assisted configuration,
- motion of the terminal entity may be monitored by means of a sensor provided at the terminal entity, such as at least one of a motion sensor, a positioning sensor, a gyroscope sensor and an accelerometer sensor,
- non-/variation of radio environment and/or operating status of the terminal entity may be monitored by means of a measuring procedure carried out at the terminal entity, such as one or more of measuring a camping/serving cell, neighboring cell or cells, candidate cell or cells, and received power and/or received quality and/or signal-to-noise ratio and/or signal-to-interference-plus-noise ratio of a reference signal,
- the relaxed radio environment related measurements may be reduced in terms of scope and/or rate as compared with the normal radio environment related measurements,
- the radio environment related measurements in the power saving mode may be relaxed with respect to the radio environment related measurements in the normal power mode by at least one of reducing number of cells to be searched and/or measured, reducing measurement frequency, increasing measurement periodicity, reducing measurement duration, and reducing measurement accuracy,
- the radio environment related measurements may comprise radio resource management measurements and/or cell search measurements,
- regular radio resource management measurements may be performed in the normal power mode and relaxed radio resource management measurements may be performed in the power saving mode,
- regular cell search measurements may be performed in the normal power mode and relaxed cell search measurements may be performed in the power saving mode,
- the relaxed radio environment related measurements may be set by network-assisted configuration,
- the relaxed radio environment related measurements may be set depending on a location of the terminal entity and/or a radio resource control state of the terminal entity and/or a daytime-related operating mode of the terminal entity,
- a timing of the radio environment related measurements in the power saving mode may be selected to be aligned with discontinuous reception and/or paging cycles,
- a periodicity of the radio environment related measurements in the power saving mode may be set to infinity under certain conditions,
- the method or apparatus functionality may further comprise holding a radio context of the terminal entity when operating in the normal power mode and/or a radio context history for predetermined locations, and referring to the held radio context or radio context history for non-/stationarity condition monitoring and/or radio environment related measurement relaxation,
- the method or apparatus functionality (at/of the terminal entity) may further comprise notifying capability information for monitoring the stationarity condition and non-stationarity conditions to a network entity, obtaining configuration information for configuring non-/stationarity condition monitoring and/or radio environment related measurement relaxation from the network entity, and configuring, as network-assisted configuration, one or more of the stationarity condition, the non-stationarity condition and the relaxed radio environment related measurements based on the configuration information,
- the configuration information may comprise an indication that relaxation of radio environment related measurements can affect one or more of intra-frequency cells, inter-frequency cells, inter-radio access technology cells, dedicated cells,
- the network-assisted configuration may comprise, or the configuration information may further be for, configuring allowance or prohibition of switching to the power saving mode depending on a parameter such as a radio resource control state of the terminal entity.

According to an example aspect of the present disclosure, there is provided a computer program product comprising (computer-executable) computer program code which, when the program code is executed (or run) on a computer or the program is run on a computer (e.g. a computer of an apparatus according to any one of the aforementioned apparatus-related example aspects of the present disclosure), is configured to cause the computer to carry out the method according to any one of the aforementioned method-related example aspects of the present disclosure.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned exemplary aspects of the present disclosure are set out in the following.

By way of exemplifying embodiments of the present disclosure, stationarity-based UE power saving in a mobile communication system can be enabled/realized. More specifically, measures/mechanisms are provided for (network-assisted) UE power saving based on local stationarity determination and autonomous power mode switching at the UE (i.e. terminal entity).

BRIEF DESCRIPTION OF THE DRAWINGS

In the following, the present disclosure will be described in greater detail by way of non-limiting examples with reference to the accompanying drawings, in which.

DETAILED DESCRIPTION

Figure 1:
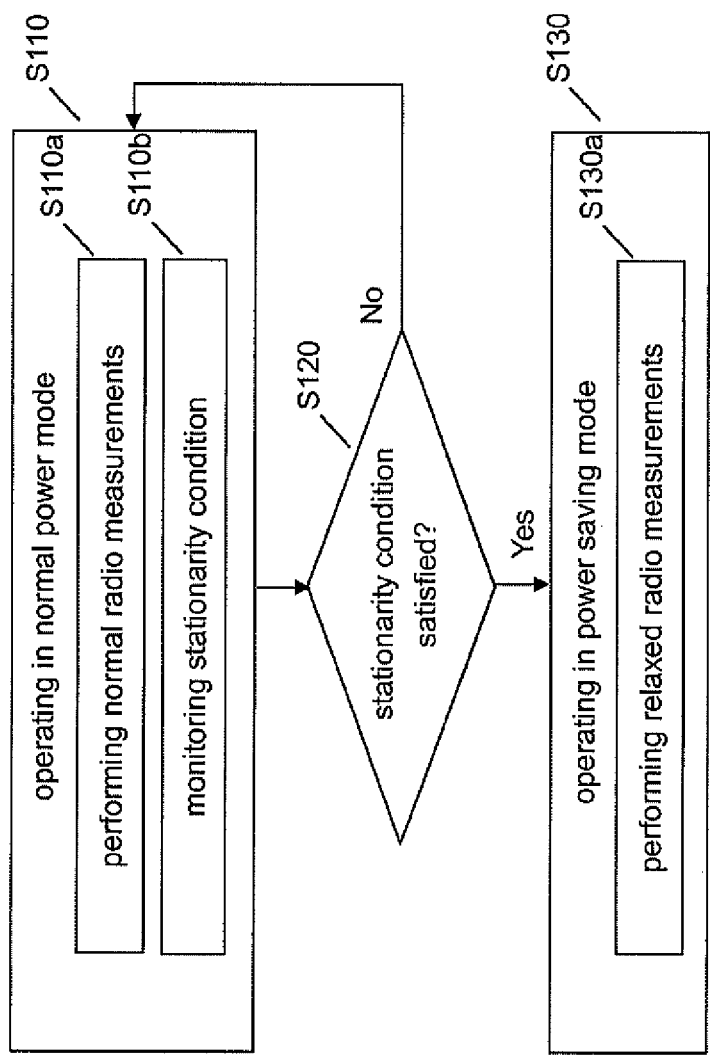
FIG. 1 shows a flowchart illustrating an example of a method according to exemplifying embodiments of the present disclosure.

The present disclosure is described herein with reference to particular non-limiting examples and to what are presently considered to be conceivable embodiments of the present disclosure. A person skilled in the art will appreciate that the present disclosure is by no means limited to these examples and embodiments, and may be more broadly applied.

It is to be noted that the following description of the present disclosure and its embodiments mainly refers to specifications being used as non-limiting examples for certain exemplifying network configurations and system deployments. Namely, the present disclosure and its embodiments are mainly described in relation to 3GPP standards, specially referring to 5G/NR standardization as well as 4G/LTE/eLTE/LTE-A standardization, being used as non-limiting examples. As such, the description of exemplifying embodiments given herein specifically refers to terminology which is directly related thereto. Such terminology is only used in the context of the presented non-limiting examples and embodiments, and does naturally not limit the disclosure in any way. Rather, any other system configuration or deployment may equally be utilized as long as complying with what is described herein and/or exemplifying embodiments described herein are applicable to it.

Hereinafter, various exemplifying embodiments and implementations of the present disclosure and its aspects are described using several variants and/or alternatives. It is generally to be noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is to be noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

According to exemplifying embodiments of the present disclosure, in general terms, there are provided measures/mechanisms (including methods, apparatuses (i.e. devices and/or functions) and computer program products) for enabling/realizing stationarity-based UE power saving. More specifically, measures/mechanisms are provided for (network-assisted) UE power saving based on local stationarity determination and autonomous power mode switching at the UE (i.e. terminal entity).

Herein, the term "radio measurements" shall generally relate to any kind of measurements related to a radio environment of a terminal entity, and can equally be denoted as "radio environment related measurements". Such radio or radio environment related measurements can encompass RRM measurements and/or cell search measurements.

Herein, the term "terminal entity" shall generally relate to any kind of terminal or user device in/of a mobile communication system, including mobile and stationary/non-mobile devices. By way of example, a terminal entity may be a user equipment, as exemplified hereinafter for illustrative purposes. The term "network entity" shall generally relate to any kind of network device or equipment in/of a mobile communication system, which is communicable with a terminal entity. By way of example, a network entity may be any kind of base station, NodeB or network control device or equipment.

FIG. 1 shows a flowchart illustrating an example of a method according to exemplifying embodiments of the present disclosure. The method of FIG. 1 is operable at or by a terminal entity (e.g. a mobile device) in/of a communication system, which will hereinafter exemplarily be referred to as UE.

As shown in FIG. 1, a method according to exemplifying embodiments of the present disclosure comprises an operation (S110) of operating in a normal power mode, including performing normal radio measurements (S110a) and monitoring a stationarity condition by means of local procedure and/or equipment (S110b), and an operation (S130) of operating in a power saving mode, including performing relaxed radio measurements (S130a). If, when operating in the normal power mode, the locally monitored stationarity condition is (monitored/determined as) satisfied (YES in S120), the method comprises an operation of switching from the normal power mode to the power saving mode, while otherwise operating in the normal power mode is continued.

Figure 2:
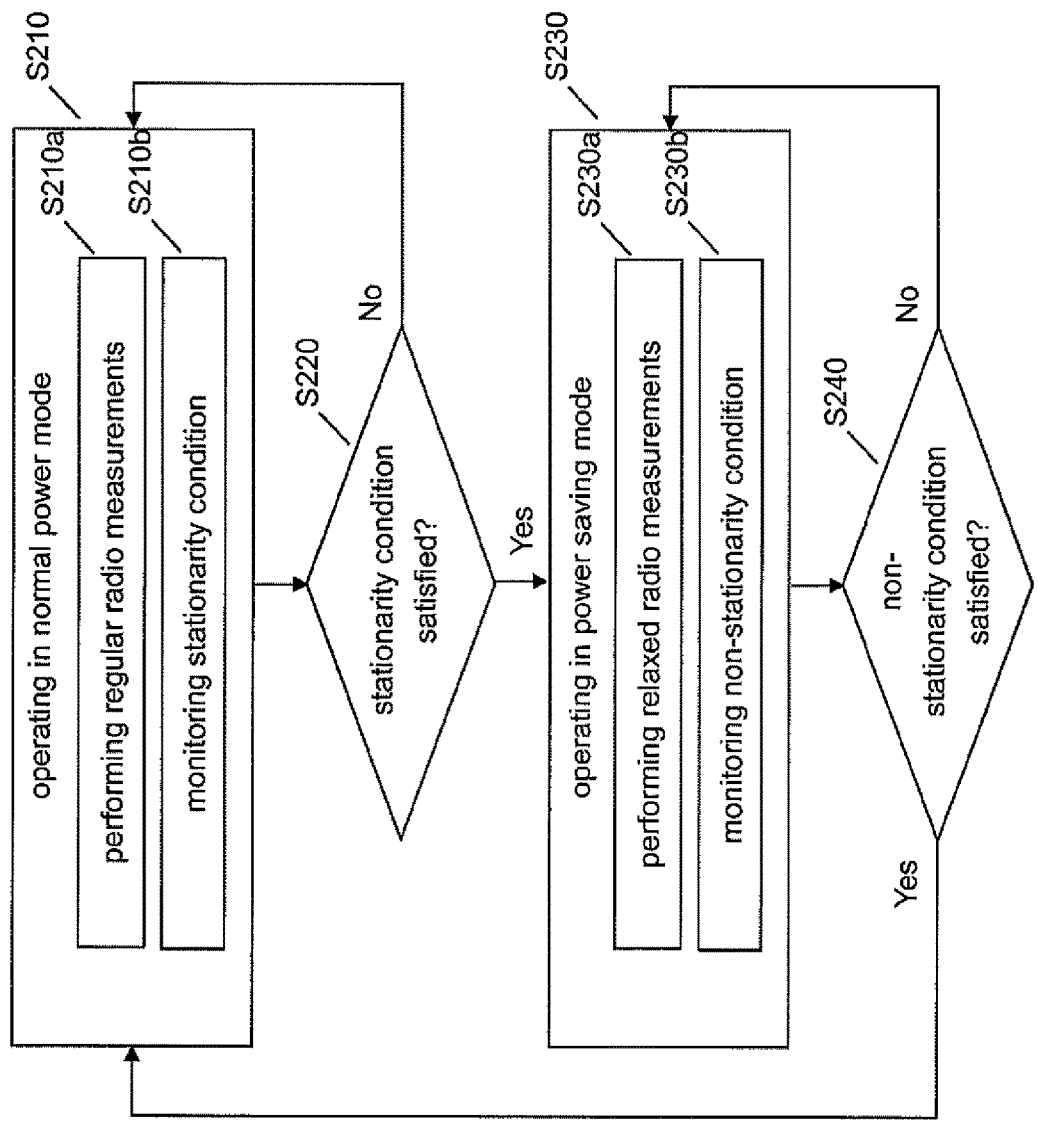
FIG. 2 shows a flowchart illustrating another example of a method according to exemplifying embodiments of the present disclosure.

FIG. 2 shows a flowchart illustrating an example of another method according to exemplifying embodiments of the present disclosure. The method of FIG. 1 is operable at or by a terminal entity (e.g. a mobile device) in/of a communication system, which will hereinafter exemplarily be referred to as UE.

As shown in FIG. 2, a method according to exemplifying embodiments of the present disclosure comprises an operation (S210) of operating in a normal power mode, including performing normal radio measurements (S210a) and monitoring a stationarity condition by means of local procedure and/or equipment (S210b), and an operation (S230) of operating in a power saving mode, including performing relaxed radio measurements (S230a) and monitoring a non-stationarity condition by means of local procedure and/or equipment (S230b). If, when operating in the normal power mode, the locally monitored stationarity condition is (monitored/determined as) satisfied (YES in S220), the method comprises an operation of switching from the normal power mode to the power saving mode, while otherwise operating in the normal power mode is continued. If, when operating in the power saving mode, the locally monitored non-stationarity condition is (monitored/determined as) satisfied (YES in S240), the method comprises an operation of switching from the power saving mode to the normal power mode, while otherwise operating in the power saving mode is continued. As explained in connection with FIG. 4 below, switching to the normal power mode encompasses to switch/transition to the same state (e.g. evaluation/measurement state) as before or another state (e.g. evaluation/measurement state), which may dependent e.g. on the measured cells, the trigger for leaving the power saving mode, or the like.

According to exemplifying embodiments of the present disclosure, the sequence of steps/operations as illustrated in FIGS. 1 and 2 can also be inverted or interchanged. Namely, the method can start with operation in the power saving mode, switch to the normal power mode when the locally monitored non-stationarity condition is satisfied, and—optionally—return to the power saving mode when the locally monitored stationarity condition is satisfied.

It is to be noted that monitoring the non-/stationarity condition encompasses (appropriate) setting of the thus monitored non-/stationarity condition, and performing normal/relaxed radio measurements encompasses (appropriate) setting of one or more parameters/values for measurement. The stationarity condition and/or the non-stationarity condition and/or the relaxed radio measurements (i.e. the relaxed radio measurement requirement/s) can be preconfigured, either statically or flexibly, and can be set by network-assisted configuration (as exemplified below).

According to exemplifying embodiments of the present disclosure, regular RRM measurements can be performed in the normal power mode (e.g. in S110a or S210a) and relaxed RRM measurements can be performed in the power saving mode (e.g. in S130a or S230a), and/or regular cell search measurements can be performed in the normal power mode (e.g. in S110a or S210a) and relaxed cell search measurements can be performed in the power saving mode (e.g. in S210a or S230a). In this regard, it is to be noted that, although cell search requires running RRM measurements, it can possibly be seen as a separate procedure as compared to the RRM measurements (i.e. considering that in RRM measurements e.g. RSRP/RSRQ of already detected cells are measured, whereas in cell search measurements e.g. RSRP/RSRQ of previously non-detected cells are measured).

Figure 3:
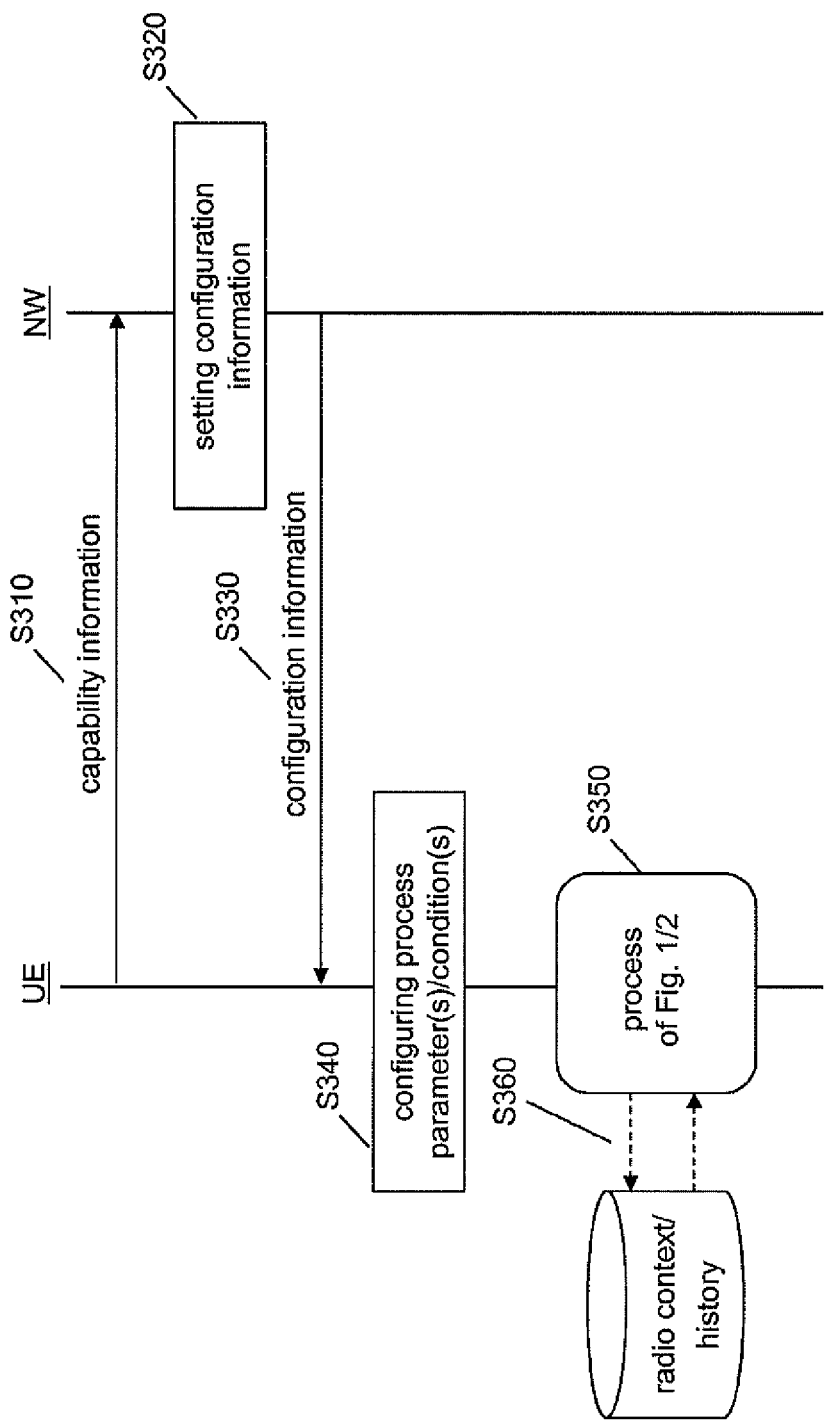
FIG. 3 shows a sequence diagram illustrating an example of a procedure according to exemplifying embodiments of the present disclosure.

By way of the method of any one of FIGS. 1 and 2, UE power saving based on local stationarity determination and autonomous power mode switching at the UE can be realized. FIG. 3 shows a sequence diagram illustrating an example of a procedure according to exemplifying embodiments of the present disclosure. The procedure of FIG. 3 is operable between a terminal entity (e.g. a mobile device) in/of a communication system, which will hereinafter exemplarily be referred to as UE, and a network entity in/of the communication system, such as e.g. a gNB in a 5G/NR system or an eNB in a 4G/LTE system, which will hereinafter exemplarily be referred to as NW.

As shown in FIG. 3, a procedure according to exemplifying embodiments of the present disclosure comprises an operation (S310) in which the UE notifies capability information for monitoring the stationarity condition and non-stationarity conditions to the NW and the NW obtains the thus notified capability information, an operation (S320) in which the NW sets configuration information, and an operation (S330) in which the NW notifies thus set configuration information to the UE and the UE obtains the thus notified configuration information. In this regard, the configuration information represent information for configuring non-/stationarity condition monitoring and/or radio measurement relaxation at the UE, namely for configuring non-/stationarity condition monitoring, by which switching between the normal power mode and the power saving mode at the UE is controlled, and/or radio measurement relaxation, by which radio measurements performed in the power saving mode are relaxed as compared with radio measurements performed in the normal power mode at the UE. Further, the procedure comprises an operation (S340) in which the UE configures, as network-assisted configuration, one or more of the stationarity condition, the non-stationarity condition and the relaxed radio measurements based on the obtained configuration information. Accordingly, the UE can set the stationarity condition and/or the non-stationarity condition and/or the relaxed radio measurements (i.e. the relaxed radio measurement requirement/s) based on the obtained configuration information. Thereupon, the procedure comprises an operation (S350) in which the UE performs the process of the method as illustrated in any one of FIGS. 1 and 2, adopting the parameter(s) and/or condition(s) as configured by network-assisted configuration in the operation S340.

For example, the network configuration (i.e. the configuration information) may comprise an indication that relaxation of radio measurements can affect one or more of intra-frequency cells, inter-frequency cells, inter-RAT cells, dedicated cells, or the like. Additionally or alternatively, the network configuration (i.e. the configuration information) may comprise/cause configuration of allowance or prohibition of switching to the power saving mode depending on a parameter such as a RRC state of the UE. Accordingly, the UE can be set/configured to be enabled to consider the influence of the network configuration on its operation (so as to adapt its control/functioning according) and/or to be allowed or prohibited to enter the power saving mode. As shown by dashed lines in FIG. 3, a procedure according to exemplifying embodiments of the present disclosure may also comprise an operation (S360) in which the UE holds (or saves/maintains) a radio context of the UE when operating in the normal power mode and/or a radio context history for predetermined locations, and the UE refers to the held (or saved/maintained) radio context or radio context history for non-/stationarity condition monitoring and/or radio measurement relaxation. For example, the UE performs radio measurements in a relaxed fashion according to the last radio context or a radio context of a known location e.g. in terms of number of cells and cell IDs to measure. Accordingly, information of a radio context or radio context history of the UE can be re-/used in the process of the method as illustrated in any one of FIGS. 1 and 2.

By way of example, the UE may build knowledge of the radio conditions observed over time. As an example, a UE that is located in one location (e.g. home location) may see a given number of cells and cell IDs, which do not change from day to day, while at other locations (e.g. work location) the UE may see a different number of cells and cell IDs in a static manner. Such information may be stored as context related information and be used when transitioning between the operating (power) modes.

It is to be noted that the utilization of information of a radio context or radio context history of the UE in the process of the method as illustrated in any one of FIGS. 1 and 2 is inherently independent of the network-assisted configuration, and can thus be applied even without network-assisted configuration.

By way of the method of FIG. 3, network-assisted UE power saving based on local stationarity determination and autonomous power mode switching at the UE can be realized.

According to exemplifying embodiments of the present disclosure, the non-/stationarity conditions generally refer to conditions or triggers for power mode switching at the UE (i.e. leaving/entering the power saving mode), wherein stationarity relates to (any sort of) constancy or steadiness in terms of UE mobility and/or radio environment of the UE (wherein a UE (radio) context can be regarded as representation of the radio environment) and/or operating status (such as a physical condition) of the UE (e.g. relating to any one power source, ambient light, presence of a physical indicator (such as a physical switch)). The stationarity condition is basically effective for indicating a situation (e.g. operating condition in any RRC state) in which less radio measurements or lower radio measurements requirements, in terms of scope and/or rate, are sufficient, while the non-stationarity condition is basically effective for indicating a situation (e.g. operating condition in any RRC state) in which more radio measurements or higher radio measurements requirements, in terms of scope and/or rate, are needed, for proper operation of the UE (in cooperation with the network or communication system).

According to exemplifying embodiments of the present disclosure, various conditions/triggers or parameters can be used for/as the stationarity condition and/or the non-stationarity condition, and various parameters can be used as/for the relaxed radio measurements (i.e. the relaxed radio measurement requirement/s).

For example, the stationarity condition can be based on (at least one condition with regard to) motion of the UE and/or (at least one condition with regard to) radio environment or radio context and/or operating status of the UE. The stationarity condition can be satisfied when monitoring, for a predetermined time period, either absence of motion of the UE (at least, if the UE can infer non-variation of radio environment or radio context and/or operating status of the UE) or absence of motion of the UE and non-variation of radio environment or radio context and/or operating status of the UE. As an example, the predetermined time period (T) for monitoring the stationarity condition can be set by network-assisted configuration, can be set depending on a location of the UE and/or a RRC state of the UE and/or a daytime-related operating mode of the UE (e.g. a night mode).

For example, the non-stationarity condition can be based on (at least one condition with regard to) motion of the UE and/or (at least one condition with regard to) radio environment or radio context and/or operating status of the UE. The non-stationarity condition can be satisfied when monitoring (at an instance or for a predetermined time period) either presence of motion of the UE or variation of radio environment or radio context and/or operating status of the UE.

Herein, absence of motion means (substantial) motionlessness or stationarity of the UE in terms of its (geographical) location and/or serving/camping cell, and presence of motion essentially means the opposite. For example, absence of motion can be determined in case of UE speed of 0 km/h or slightly above (i.e. below a predefined threshold). The motion of the UE is locally monitored by means of local/internal procedure and/or equipment, such as a sensor provided at the UE. Such sensor can be at least one of a motion sensor, a positioning sensor (a sensor of a global navigation satellite system such as GPS, Glonass, Galileo, or the like), a gyroscope sensor and an accelerometer sensor.

Herein, non-variation of radio environment means (substantial) constancy, uniformity or stability of the UE in terms of its (prevailing or observed or applicable) radio conditions or radio signal/channel conditions, and variation of radio environment essentially means the opposite. Namely, variation means that there is at least some variation in the UE's radio environment (i.e. up to a predefined extent). For example, non-variation of radio environment can be determined in case a UE (radio) context does not change, wherein the UE (radio) context comprises one or more of measuring a camping/serving cell (e.g. identified by the PCell/Serving Cell ID), neighboring cell or cells, candidate cell or cells, and received power and/or received quality and/or signal-to-noise ratio and/or signal-to-interference-plus-noise ratio of a reference signal (RSRP, RSRQ, SNR, SINR). The (non-/variation of the) radio environment is locally monitored by means of local/internal procedure and/or equipment, such as a measuring procedure carried out at the UE, e.g. one or more of measuring the aforementioned parameters/values. The radio environment can be determined to be non-variant in case the camping/serving cell (e.g. identified by the PCell/Serving Cell ID) does not change, neighboring cell or cells do not change (at least in some extent/number), candidate cell or cells do not change (at least in some extent/number), and received power and/or received quality and/or signal-to-noise ratio and/or signal-to-interference-plus-noise ratio of a reference signal (RSRP, RSRQ, SNR, SINR) do not change (at least in some extent/number or amount).

Herein, non-variation of operating status means (substantial) constancy, uniformity or stability of the UE in terms of its (prevailing or observed or applicable) operating status (such as its physical condition), and variation of operating status essentially means the opposite. Namely, variation means that there is at least some variation in the UE's operating status (i.e. up to a predefined extent). For example, the operating status or physical condition of the UE may vary when another power source is applied or used, the ambient light changes, a physical switch is operated, or the like.

According to exemplifying embodiments of the present disclosure, the UE may also obtain knowledge of its stationarity/non-stationarity for example as follows. On the one hand, the UE may know by configuration that it is not supposed to move. This would for example apply to terminal entities that are physically mounted to stationary devices (e.g. a sensor mounted in a power plant, a modem mounted in a docking station). On the other hand, the UE may be able to detect some non-/stationarity-related parameter, which could exemplarily be denoted as "risk of non-stationarity", from external sources. An example of this would be that the power supply source changes. This would be seen when a UE is losing its power cable (indicating that UE is not restricted by cable), Also, in case a docking station is starting from loss of power supply, the conditions may have changed significantly.

Herein, relaxation of radio measurements or measurement requirements in the power saving mode means that less radio measurements or lower radio measurements requirements, in terms of scope and/or rate, are set and applied. Accordingly, such relaxation refers to (down-) scaling of radio measurements or measurement requirements. That is, the relaxed radio measurements are (set so as to be) reduced in terms of scope and/or rate as compared with the normal/regular radio measurements. For example, the radio measurements in the power saving mode are relaxed with respect to the radio measurements in the normal power mode by at least one of reducing number of cells to be searched and/or measured, reducing measurement frequency, increasing measurement periodicity, reducing measurement duration, and reducing measurement accuracy. As described above, the (parameter/s of the) relaxed radio measurements can be set by network-assisted configuration. Further, as described below, the (parameter/s of the) relaxed radio measurements can be set depending on a location of the UE and/or a RRC state of the UE and/or a daytime-related operating mode of the UE (e.g. a night mode).

The radio measurements can e.g. be any one of RSRP, RSRQ, SNR and SINR for use for mobility purposes (i.e. cell quality measurements for cell reselection, handover decisions). In 4G/LTE, the radio measurements are based on a Cell-specific Reference Signal (CRS). In 5G/NR, in the absence of CRS, the radio measurements are based on different physical signals.

The radio measurements can e.g. work as follows. On the one hand, UEs in RRC Idle or RRC Inactive state only measure cells at every paging opportunity of the serving cell, so according to the paging cycle. This is at least every Tmeasure,NR_Intra seconds for intra-frequency cells that are identified and measured according to the measurement rules. On the other hand, UEs in RRC Connected state perform measurements according to their C-DRX configuration. SSB-based measurements are configured along with at least one measurement timing configuration (SMTC) which accounts for C-DRX. The UE measure multiple beams (at least one) of a cell and the measurements results (power values) are averaged to derive the cell quality. In doing so, the UE consider a subset of the detected beams. Filtering takes place at two different levels: at the physical layer to derive beam quality and then at RRC level to derive cell quality from multiple beams. The SS/PBCH block (SSB) burst consists of multiple SSBs, which are associated with the different SSB indices and potentially with the different transmission beams. Besides, the CSI-RS signals can also be configured for beam management and measurement. The SSB-based measurement timing configuration (SMTC) with a certain duration and periodicity is used to restrict the UE measurement on certain resources to reduce the UE power consumption. Within the SMTC period and on the configured SSB(s) and/or CSI-RS, the UE will conduct the radio measurements.

Accordingly, configuration information for configuring the UE for operation in the power saving mode, such as network configuration information, may include a SMTC period or multiple thereof and/or SSB(s) and/or CSI-RS for the relaxed radio measurements.

Generally, it is noted that herein reference is made to radio measurements. As noted above, these references could e.g. be replaced by or understood as references to RRM measurements, but also RLM measurements or RLM/RRM measurements in equal measure.

According to exemplifying embodiments of the present disclosure, power saving of the terminal entity can be achieved, even without affecting user operability or user experience. For example, for an UE running eMBB traffic, multiple background "always-on" messages for multiple applications could be anticipated to be exchanged in the background without the user's intervention/trigger, also when the UE is operating in the power saving mode. However, these messages are not latency-sensitive, so that switching the UE from the normal power mode to the power saving mode as described herein can reach power savings without compromising application behavior and the perceived latency by the user (i.e. the relaxed radio measurements or measurement requirements in the power saving mode do not adversely affect these messages or their related effect/purpose or application). Accordingly, the teaching of the present disclosure can for example positively influence the adoption of handsets which support the same, as the associated power savings will be effective to improve the satisfaction of the user.

Figure 4:
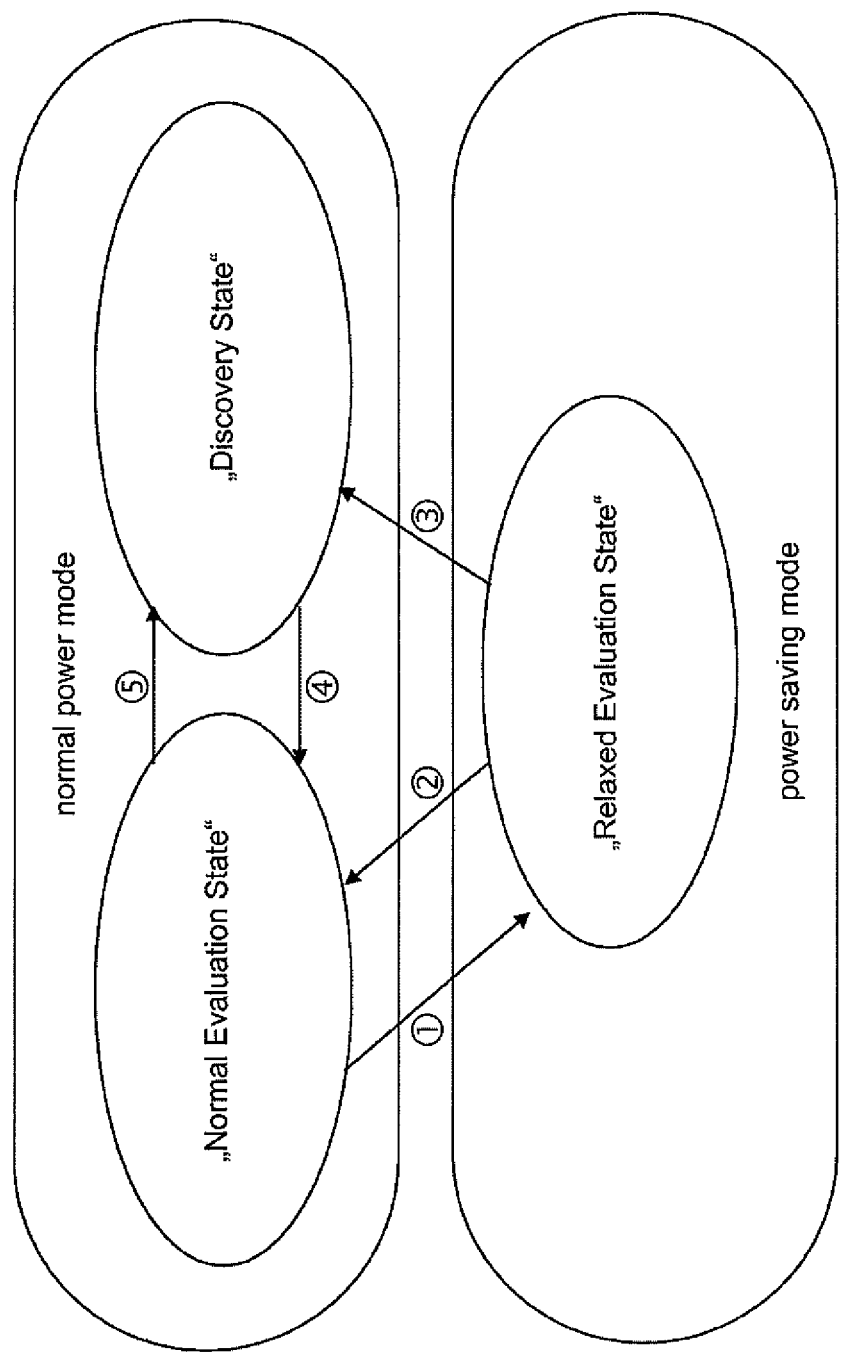
FIG. 4 shows a state diagram illustrating an example of states and state transitions according to exemplifying embodiments of the present disclosure.

FIG. 4 shows a state diagram illustrating an example of states and state transitions according to exemplifying embodiments of the present disclosure. The state diagram of FIG. 4 reflects the operations at or by a terminal entity (e.g. a mobile device) in/of a communication system, which will hereinafter exemplarily be referred to as UE.

In FIG. 4, the "Normal Evaluation State" refers to a radio measurement related state in the normal power mode, in which regular UE behavior in terms of normal/regular radio measurements is realized, the "Discovery State" refers to a radio measurement related state in the normal power mode, in which additional/enhanced radio measurements are temporarily performed in order to attain an up-to-date UE (radio) context, including e.g. cell search, and the "Relaxed Evaluation State" refers to a radio measurement related state in the power saving mode, in which optimized UE behavior in terms of relaxed radio measurements for UE power saving is realized. This optimized UE behavior in the "Relaxed Evaluation State" can be based on the valid/latest UE (radio) context.

State transition (1) is caused/initiated by a trigger such as absence of UE motion and radio environment non-variation, and potentially UE location and/or UE operating mode, e.g. in case of absence of UE motion and radio environment non-variation. In or with state transition (1), the valid/latest UE (radio) context is held or saved/maintained, including e.g. serving/camping cell and N candidate cells or N strongest neighbor cells. State transition (2) is caused/initiated by a trigger such as presence of UE motion, and state transition (3) is caused/initiated by a trigger such as radio environment variation, e.g. change of a radio (signal/channel) condition.

State transitions (4) and (5) are caused/initiated by a trigger such as one or more of a timer, a threshold, an event, or the like.

According to exemplifying embodiments of the present disclosure, as described above, there are provided measures/mechanisms for a UE to autonomously switch, e.g. when allowed to do so by the network, to a power saving mode based on conditions that are detected locally at the UE. Such conditions may rely on detection of motions and/or change of the radio environment through indirect means like measurements or through direct means by sensors implemented in the UE.

In this regard, the UE may indicate to the network its capability to observe UE motion (and lack of the same) and, in response to that, the network may configure the UE to autonomously switch to a new power saving mode, including parameters and/or conditions. The UE determines lack of UE motion and stationarity of the radio environment (i.e. lack radio signal/channel changes) based on internal UE measurements and sensors, and, at least in dependence of these conditions, the UE triggers a transition between the normal power mode (cf. "Normal Evaluation State" and "Discovery State") and the power saving mode (cf. "Relaxed Evaluation State"). In the power saving mode, the UE performs radio measurements in a relaxed fashion according to the last UE radio context e.g. in terms of number of cells and cell IDs to measure. In addition to the number of cells to measure, the UE may also adjust the measurement frequency and accuracy to save power. While the UE is in the power saving mode (cf. "Relaxed Evaluation State"), it is committed to monitor triggers indicating UE motion and variability of the radio environment (i.e. radio signal/channel changes). If any of these are triggered, the UE must leave the power saving mode (cf. "Relaxed Evaluation State") and return to the normal power mode (cf. "Normal Evaluation State" and "Discovery State").

In the following, various use case examples of exemplifying embodiments of the present disclosure are described in view of their functionalities and benefits.

In this regard, it is assumed that the UE is aware of the radio environment. If the UE radio context is constant/invariable and lack of motion is detected by one or more local sensors and/or measurements in the UE, the UE can switch to the power saving mode so as to save power without risking degradation of its mobility performance.

In one use case example, the UE has measured the UE radio context in terms of PCell/Serving Cell ID and x neighbor Cell IDs in addition to their RSRP/RSRQ values. When no motion is detected at least for a network defined period T ("no motion") based on one or more UE sensors, the UE can infer that the UE radio context will probably not change for the next time period, and therefore can trigger switching to the power saving mode or "Relaxed Evaluation State", thus reducing radio measurement scope and rate to a lower or even minimum level. In turn, this reduces the UE power consumption. It is to be noted that the UE is committed to monitor triggers for motion change and signal change and leave the relaxed state if any one of the triggers is activated.

As indicated above, the UE may be able to store radio context history for predetermined "known" locations, e.g. home, office or any recurrently visited location, in terms of their respective UE radio context. Hence, the UE can hold, maintain or save a radio context including e.g. Pcell/Serving Cell ID, neighbor cells IDs and their respective RSRP/RSRQ levels for such "known" location. If the UE is in/at one of the known locations, it may determine satisfaction of the stationarity condition faster and/or enter the power saving state with even more reduced radio measurement requirements, i.e. even further relaxed radio measurements, using the radio context history. Namely, in view of the radio context for a respective location, the UE can specify and set appropriately relaxed radio measurement requirements.

In one use case example, the UE detects that it is located e.g. at home (radio context="home radio") or at office (radio context="office radio"). This could be determined by a combination of Serving and Strongest Cell IDs and their RSRP/RSRQ values matching a known pattern held, maintained or saved as "home" or "office". Since a known location is detected, the identification may happen faster, and the UE may be able to perform even more relaxed measurements in the power saving mode or "Relaxed Evaluation State". When no motion is detected at least for a (e.g. network-defined) period T ("no motion"), the UE may follow the above-described procedure.

Also, based on an ambient light sensor/camera in the UE that monitors darkness and/or time context, the UE can detect a daytime-related operating mode such as e.g. "night mode". In case the UE detects "night mode" and "home radio" and "no motion", the UE can further reduce the scope and/or rate of radio measurements, e.g. according to the network definitions and/or configuration.

The period T ("no motion") can be set differently based e.g. on the RRC state of the UE, e.g. by way of network configuration. For example, T can be configured/set to be larger when the UE is in the RRC Connected state as compared with the RRC Idle or Inactive state.

The UE can be set/configured to be allowed or prohibited to enter the power saving mode based e.g. on the RRC state of the UE, e.g. by way of network configuration. For example, the network can indicate prohibition for switching to the power saving mode when the UE is in the RRC Connected state, and allowance for switching to the power saving mode when the UE is in the RRC Inactive or Idle state.

Also, a timing of the radio measurements in the power saving mode can be selected to be aligned with discontinuous reception and/or paging cycles, and/or a periodicity of the radio measurements in the power saving mode can be set to infinity under certain conditions.

In one use case example, the power saving mode or "Relaxed Evaluation State" can be associated with additional measurement timing configurations (SMTC), whose periodicity and/or duration values are relaxed to save power. The UE could be allowed to select the exact timing of the radio measurements to be in accordance (aligned) with the DRX and/or paging cycles. This assumes that the network would align e.g. the paging cycles of the UE to be multiples of the SSB transmissions, and/or, if this is not feasible, to operate with a higher frequency of SSB transmissions to enable more alignment opportunities.

In one use case example, the SMTC measurement periodicity can be infinity, as long as the UE meets certain conditions (e.g. "night mode" & "home radio" & "no motion"), which result in the UE not changing the serving cell for a long period. Upon activation of such extreme mode (SMTC periodicity=infinity), the network (e.g. the gNB) inherently commits to not use power saving strategies to the serving cell. In case of cell failure, such failure condition can be resolved by normal UE reselection procedures, which would result in similar delay as in paging operations (network-initiated data delivery).

As noted above, exemplifying embodiments of the present disclosure are applicable to any system configuration or deployment, as long as complying with what is described herein. For example, aspects relating to UE operation for radio measurements comprising RRC Connected and RRC Idle/RRC Inactive states are applicable to 5G/NR systems, as well as all of current or future system supporting these RRC states. For example, if RRC Inactive state is not supported, such as currently in 4G/LTE/eLTE/LTE-A systems, such aspects are to be considered as relating to UE operation for radio measurements comprising RRC Connected and RRC Idle states, wile disregarding/omitting any references to RRC Inactive state.

By virtue of exemplifying embodiments of the present disclosure, as evident from the above, stationarity-based UE power saving in a mobile communication system can be enabled/realized. More specifically, measures/mechanisms are provided for (network-assisted) UE power saving based on local stationarity determination and autonomous power mode switching at the UE (i.e. terminal entity).

In this regard, (network-assisted) procedures to enable the UE to autonomously relax the radio measurements or radio measurement requirements based on stationarity detection at the UE for reducing its energy/power consumption are proposed. Thereby, it can be achieved to efficiently relax radio measurements or radio measurement requirements so as to facilitate power saving without affecting the mobility performance beyond an acceptable level. As outlined above, it can thereby be achieved that power savings are realized without affecting user operability or user experience.

Some of the achievable advantages also include, for example, that reliable detection of stationary (in terms of mobility) UEs can be realized using low-power UE-internal sensors as compared to power-consuming network-based mobility estimation, and reduced UE power consumption in the power saving mode can be realized as compared to current measurement framework. The end user is not impacted since he/she is not using the UE (in the periods subject to switching to the power saving mode), and the UE will autonomously return to the normal power mode whenever needed due to the commitment to monitor motion and radio signal change triggers.

By way of utilizing one or more sensors already available at the UE (i.e. currently available UE sensors present in a typical smartphone/tablet/device for other purposes), in order to trigger radio measurement relaxation, it can be achieved that the motion/mobility detection is sufficiently accurate (to avoid negative impact to mobility performance) and, at the same time, consumes low power (to avoid outweighing the benefits). Further, the motion/mobility detection can be achieved without requiring additional hardware/equipment at the UE. For example, at least one of a motion sensor, a positioning sensor, a gyroscope sensor and an accelerometer sensor can be used as an accurate and low-power source of motion indication for the modem operations.

Further, it is utilized that a typical smartphone/tablet/device will be stationary during the period where the user sleeps, and in addition during long periods of the day where the user places the phone on his/her office desk or at home. Namely, those stationary periods, which can be detected locally at the UE, are used for operating in the power saving mode with relaxes radio measurements.

The above-described methods, procedures and functions may be implemented by respective functional elements, entities, modules, units, processors, or the like, as described below.

While in the foregoing exemplifying embodiments of the present disclosure are described mainly with reference to methods, procedures and functions, corresponding exemplifying embodiments of the present disclosure also cover respective apparatuses, entities, modules, units, network nodes and/or systems, including both software and/or hardware thereof.

Respective exemplifying embodiments of the present disclosure are described below referring to FIGS. 5 and 6, while for the sake of brevity reference is made to the detailed description of respective corresponding configurations/setups, schemes, methods and functionality, principles and operations according to FIGS. 1 to 4.

Figure 5:
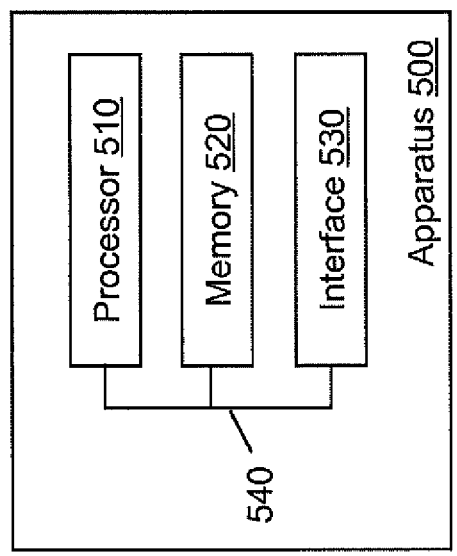
FIG. 5 shows a schematic diagram illustrating an example of a structure of apparatuses according to exemplifying embodiments of the present disclosure.
Figure 6:
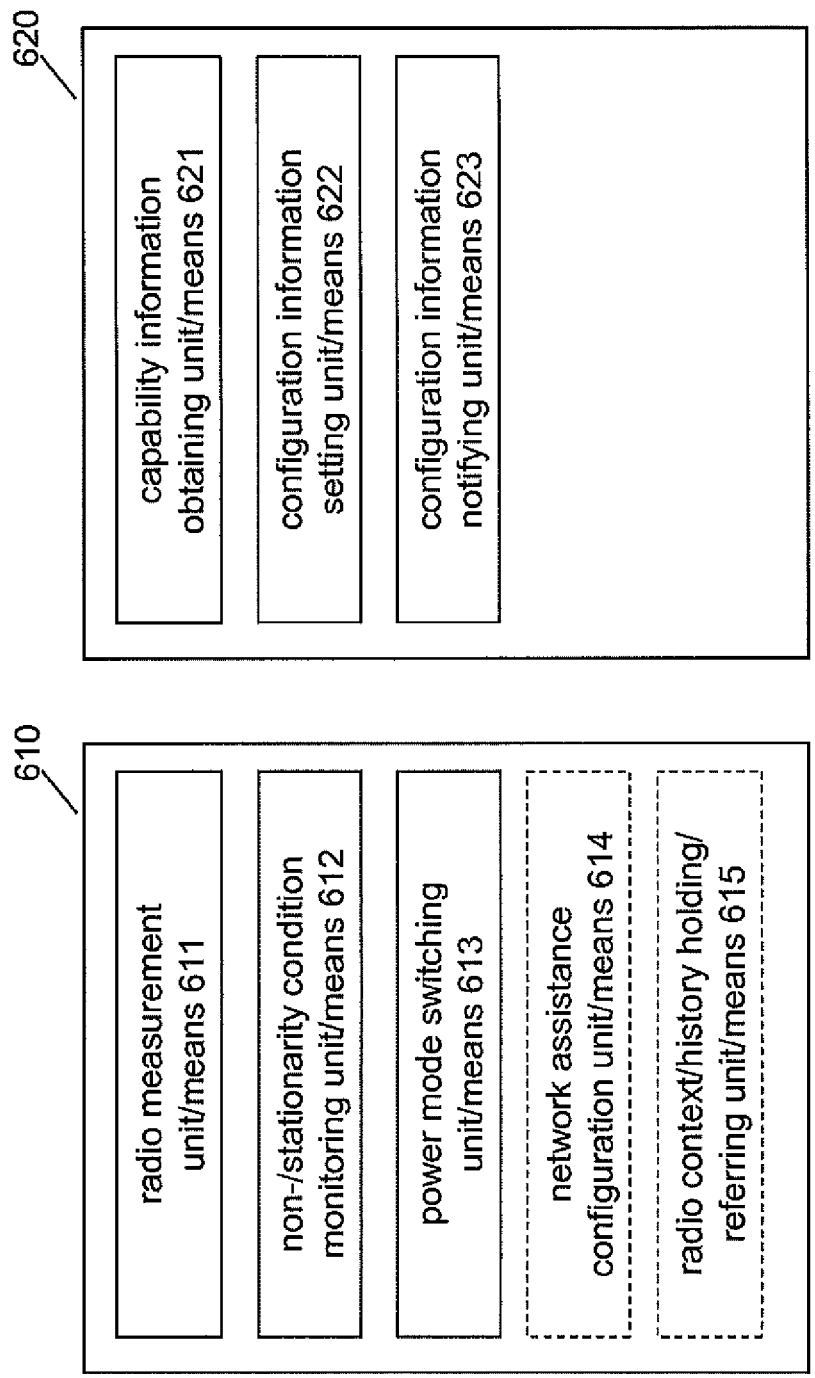
FIG. 6 shows a schematic diagram illustrating an example of a functional structure of apparatuses according to exemplifying embodiments of the present disclosure.

In FIGS. 5 and 6, the blocks are basically configured to perform respective methods, procedures and/or functions as described above. The entirety of blocks are basically configured to perform the methods, procedures and/or functions as described above, respectively. With respect to FIGS. 5 and 6, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIGS. 5 and 6, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories or the like. Among others, one or more memories are provided for storing programs or program instructions for controlling or enabling the individual functional entities or any combination thereof to operate as described herein in relation to exemplifying embodiments.

FIG. 5 shows a schematic diagram illustrating an example of a structure of apparatuses according to exemplifying embodiments of the present disclosure. Herein, an apparatus can represent a device or a function, i.e. a structural device implementing a specific network element, entity or function or the functionality thereof as such.

As indicated in FIG. 5, according to exemplifying embodiments of the present disclosure, an apparatus 500 may comprise at least one processor 510 and at least one memory 520 (and possibly also at least one interface 530), which may be operationally connected or coupled, for example by a bus 540 or the like, respectively.

The processor 510 and/or the interface 530 of the apparatus 500 may also include a modem or the like to facilitate communication over a (hardwire or wireless) link, respectively. The interface 530 of the apparatus 500 may include a suitable transmitter, receiver or transceiver connected or coupled to one or more antennas, antenna units, such as antenna arrays or communication facilities or means for (hardwire or wireless) communications with the linked, coupled or connected device(s), respectively. The interface 530 of the apparatus 500 is generally configured to communicate with at least one other apparatus, device, node or entity (in particular, the interface thereof).

The memory 520 of the apparatus 500 may represent a (non-transitory/tangible) storage medium and store respective software, programs, program products, macros or applets, etc. or parts of them, which may be assumed to comprise program instructions or computer program code that, when executed by the respective processor, enables the respective electronic device or apparatus to operate in accordance with the exemplifying embodiments of the present disclosure. Further, the memory 520 of the apparatus 500 may (comprise a database to) store any data, information, or the like, which is used in the operation of the apparatus. For example, the memory 520 may represent or implement a buffer for buffering UL data, as described above.

In general terms, respective apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated apparatus 500 is suitable for use in practicing one or more of the exemplifying embodiments of the present disclosure, as described herein.

When in the subsequent description it is stated that the processor (or some other means) is configured to perform some function, this is to be construed to be equivalent to a description stating that a (i.e. at least one) processor or corresponding circuitry, potentially in cooperation with a computer program code stored in the memory of the respective apparatus or otherwise available (it should be appreciated that the memory may also be an external memory or provided/realized by a cloud service or the like), is configured to cause the apparatus to perform at least the thus mentioned function.

According to exemplifying embodiments of the present disclosure, the thus illustrated apparatus 500 may represent or realize/embody a (part of a) a terminal entity (e.g. a mobile device) in/of a communication system, such as a UE as described above. Hence, the apparatus 500 may be configured to perform a procedure and/or exhibit a functionality and/or implement a mechanism, as described for the UE, in any one of FIGS. 1 to 4.

Accordingly, the apparatus 500 may be caused or the apparatus 500 or its at least one processor 510 (possibly together with computer program code stored in its at least one memory 520), in its most basic form, is configured to operate in a normal power mode, including performing normal radio environment related measurements and monitoring a stationarity condition by means of local procedure and/or equipment, to switch from the normal power mode to a power saving mode, if the locally monitored stationarity condition is satisfied, and to operate in the power saving mode, including performing relaxed radio environment related measurements.

According to exemplifying embodiments of the present disclosure, the thus illustrated apparatus 500 may represent or realize/embody a (part of a) a network entity in/of a communication system, such as a NW or gNB as described above. Hence, the apparatus 500 may be configured to perform a procedure and/or exhibit a functionality and/or implement a mechanism, as described for the NW, in any one of FIGS. 1 to 4.

Accordingly, the apparatus 500 may be caused or the apparatus 500 or its at least one processor 510 (possibly together with computer program code stored in its at least one memory 520), in its most basic form, is configured to obtain capability information for monitoring stationarity condition and non-stationarity conditions from a terminal entity, to set configuration information for configuring non-/stationarity condition monitoring, by which switching between a normal power mode and a power saving mode at the terminal entity is controlled, and/or radio environment related measurement relaxation, by which radio environment related measurements performed in the power saving mode are relaxed as compared with radio environment related measurements performed in the normal power mode at the terminal entity, and to notify the configuration information to the terminal entity.

As mentioned above, an apparatus according to exemplifying embodiments of the present disclosure may be structured by comprising respective units or means for performing corresponding operations, procedures and/or functions. For example, such units or means may be implemented/realized on the basis of an apparatus structure, as exemplified in FIG. 5, i.e. by one or more processors 510, one or more memories 520, one or more interfaces 530, or any combination thereof.

FIG. 6 shows a schematic diagram illustrating another example of a functional structure of an apparatus according to exemplifying embodiments of the present disclosure.

It is to be noted that the individual apparatuses shown in FIG. 6 are inherently independent from each other but could be operable to interwork, i.e. exemplifying embodiments of the present disclosure cover any one of these apparatuses alone or any combination of such apparatuses (including one or more of any one of these apparatuses).

As shown in FIG. 6, an apparatus 610 according to exemplifying embodiments of the present disclosure may represent or realize/embody a (part of a) a terminal entity (e.g. a mobile device) in/of a communication system. Specifically, the apparatus 600 may for example be a (part of a) a UE as described above. Such apparatus may operate in either one of a normal power mode and a power saving mode, and may comprise (at least) a unit or means for performing radio environment related measurements (denoted as radio measurement unit/means 611), which is configured to performing normal radio environment related measurements in the normal power mode and relaxed radio environment related measurements in the power saving mode, a unit or means for monitoring a non-/stationarity condition by means of local procedure and/or equipment (denoted as non-/stationarity condition monitoring unit/means 612), which is configured to monitor the stationarity condition in the normal power mode and the non-stationarity condition in the power saving mode, and a unit or means for switching between the normal power mode and the power saving mode (denoted as power mode switching unit/means 613), which is configured to perform, cause or initiate switching from the normal power mode to the power saving mode, if the locally monitored stationarity condition is satisfied when operating in the normal power mode, and switching from the power saving mode to the normal power mode, if the locally monitored non-stationarity condition is satisfied when operating in the power saving mode.

As evident from the above, for example, the apparatus 610 may optionally also comprise one or more of a unit or means for notifying capability information for monitoring the stationarity condition and non-stationarity conditions to a network entity, obtaining configuration information for configuring non-/stationarity condition monitoring and/or radio environment related measurement relaxation from the network entity, and configuring, as network-assisted configuration, one or more of the stationarity condition, the non-stationarity condition and the relaxed radio environment related measurements based on the configuration information (denoted as network assistance configuration unit/means 614), and a unit or means for holding a radio context of the terminal entity when operating in the normal power mode and/or a radio context history for predetermined locations, and referring to the held radio context or radio context history for non-/stationarity condition monitoring and/or radio environment related measurement relaxation (denoted as radio context/history holding/referring unit/means 615).

As shown in FIG. 6, an apparatus 620 according to exemplifying embodiments of the present disclosure may represent or realize/embody a (part of a) a network entity in/of a communication system. Specifically, the apparatus 600 may for example be a (part of a) a NW or gNB as described above. Such apparatus may comprise (at least) a unit or means for obtaining capability information for monitoring stationarity condition and non-stationarity conditions from a terminal entity (denoted as capability information obtaining unit/means 621), a unit or means for setting configuration information for configuring non-/stationarity condition monitoring, by which switching between a normal power mode and a power saving mode at the terminal entity is controlled, and/or radio environment related measurement relaxation, by which radio environment related measurements performed in the power saving mode are relaxed as compared with radio environment related measurements performed in the normal power mode at the terminal entity (denoted as configuration information setting unit/means 622), and a unit or means for notifying the configuration information to the terminal entity (denoted as configuration information notifying unit/means 623).

For further details regarding the operability/functionality of the individual apparatuses (or units/means thereof) according to exemplifying embodiments of the present disclosure, reference is made to the above description in connection with any one of FIGS. 1 to 4, respectively.

According to exemplifying embodiments of the present disclosure, any one of the (at least one) processor, the (at least one) memory and the (at least one) interface, as well as any one of the illustrated units/means, may be implemented as individual modules, chips, chipsets, circuitries or the like, or one or more of them can be implemented as a common module, chip, chipset, circuitry or the like, respectively.

According to exemplifying embodiments of the present disclosure, a system may comprise any conceivable combination of any depicted or described apparatuses and other network elements or functional entities, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present disclosure. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units/means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling/realizing stationarity-based UE power saving, specifically network-assisted power saving at a terminal entity based on local stationarity monitoring and autonomous power saving mode switching. Such measures exemplarily comprise that a terminal entity operates in a normal power mode, including performing normal radio environment related measurements (such as regular radio resource management measurements and/or cell search measurements) and monitoring a stationarity condition by means of local procedure and/or equipment, switches from the normal power mode to a power saving mode, if the locally monitored stationarity condition is satisfied, and operates in the power saving mode, including performing relaxed radio environment related measurements (such as relaxed radio resource management measurements and/or cell search measurements).

Even though the disclosure is described above with reference to the examples according to the accompanying drawings, it is to be understood that the disclosure is not restricted thereto. Rather, it is apparent to those skilled in the art that the present disclosure can be modified in many ways without departing from the scope of the inventive idea as described herein.

LIST OF ACRONYMS AND ABBREVIATIONS

3GPP 3rd Generation Partnership Project
4G 4th Generation
5G 5th Generation
C-DRX Connected Mode Discontinuous Reception
CRS Cell-specific Reference Signal CSI-RS Channel State Information Reference Signal
DRX Discontinuous Reception
eLTE enhanced LTE
eMBB enhanced Mobile Broadband
eNB evolved NodeB
gNB Next generation NodeB
GPS Global Navigation Satellite System
ID Identifier
LTE Long Term Evolution
LTE-A Long Term Evolution Advanced
NR New Radio
NW Network
PBCH Physical Broadcast Channel
PDCCH Physical Downlink Control Channel
RAT Radio Access Technology
RLM Radio Link Monitoring
RRC Radio Resource Control
RRM Radio Resource Management
RSRP Reference Signal Received Power
RSRQ Reference Signal Received Quality
SINR Signal-to-Interference-plus-Noise Ratio
SMTC SS/PBCH Block based RRM Measurement Timing Configuration
SNR Signal-to-Noise Ratio
SS Synchronization Signal
SSB SS/PBCH block
UE User Equipment

The invention claimed is:

1. A method comprising:
operating a terminal entity in a normal power mode by at least performing normal radio environment related measurements and monitoring locally at the terminal entity for a stationarity condition with at least one of a local procedure or a local equipment;
in an instance in which the stationarity condition being monitored locally at the terminal entity is satisfied, switching the terminal entity from the normal power mode to a power saving mode; and
operating the terminal device in the power saving mode by at least performing relaxed radio environment related measurements,
wherein the stationarity condition being monitored locally at the terminal device is set by network-assisted configuration, or
wherein the relaxed radio environment related measurements are set by network-assisted configuration.

2. The method of claim 1, wherein, the operating the terminal entity in the power saving mode further includes monitoring a non-stationarity condition with at least one of; the local procedure or the local equipment, and wherein the method further comprises:
in an instance in which the non-stationarity condition monitored locally at the terminal device is satisfied, switching the terminal entity from the power saving mode to the normal power mode.

3. The method of claim 1, wherein the stationarity condition is determined to be satisfied by monitoring, for a predetermined time period, for one of:
an absence of motion of the terminal entity, or
an absence of motion of the terminal entity and a non-variation of at least one of: a radio environment of the terminal entity or an operating status of the terminal entity.

4. The method of claim 3, wherein the predetermined time period for monitoring the stationarity condition is set based upon network-assisted configuration.

5. The method of claim 3, wherein the predetermined time period for monitoring the stationarity condition is set depending on at least one of: a location of the terminal entity, a radio resource control state of the terminal entity, or a daytime-related operating mode of the terminal entity.

6. The method of claim 2, wherein the non-stationarity condition is determined to be satisfied by monitoring for at least one of:
a presence of motion of the terminal entity, or
a variation of at least one of a radio environment of the terminal entity or an operating status of the terminal entity.

7. The method of claim 1, wherein a non-stationarity condition being monitored is set with network-assisted configuration.

8. The method of claim 3,
wherein the absence or the presence of motion of the terminal entity is monitored using a sensor provided at the terminal entity, the sensor comprising one or more of: a motion sensor, a positioning sensor, a gyroscope sensor, or an accelerometer sensor, or
wherein the variation of radio the radio environment of the terminal entity or the operating status of the terminal entity is monitored with a measuring procedure carried out at the terminal entity, the measuring procedure comprising one or more of: measuring a camping cell, measuring a serving cell, measuring one or more neighboring cells, measuring one or more candidate cells, measuring a received power of a reference signal, measuring a received quality of a reference signal, measuring a signal-to-noise ratio of a reference signal, or measuring a signal-to-interference-plus-noise ratio of a reference signal.

9. The method of claim 1, wherein the relaxed radio environment related measurements are reduced in terms of at least one of: a scope as compared with the normal radio environment related measurements or a rate as compared with the normal radio environment related measurements.

10. The method of claim 1, wherein the radio environment related measurements by the terminal entity when in the power saving mode are relaxed with respect to the radio environment related measurements in the normal power mode with regard to at least one of: a reduced number of cells to be searched or measured, a reduced measurement frequency, an increased measurement periodicity, a reduced measurement duration, or a reduced measurement accuracy.

11. The method of claim 1, wherein the radio environment related measurements comprise at least one of: radio resource management measurements or cell search measurements.

12. The method of claim 11, wherein
regular radio resource management measurements are performed in the normal power mode and relaxed radio resource management measurements are performed in the power saving mode, or
regular cell search measurements are performed in the normal power mode and relaxed cell search measurements are performed in the power saving mode.

13. The method of claim 9, wherein the relaxed radio environment related measurements are set depending on at least one of; a location of the terminal entity, a radio resource control state of the terminal entity, or a daytime-related operating mode of the terminal entity.

14. The method of claim 9, wherein at least one of;
a timing of the radio environment related measurements in the power saving mode is selected to be aligned with at least one of: discontinuous reception or paging cycles, or a periodicity of the radio environment related measurements in the power saving mode is set to infinity.

15. The method of claim 1, further comprising:
holding a radio context of the terminal entity when operating in at least one of: the normal power mode or a radio context history for predetermined locations; and
referring to the radio context held for the terminal entity or radio context history for at least one of: stationarity condition monitoring, non-stationarity condition monitoring, or radio environment related measurement relaxation.

16. The method of claim 2, further comprising:
providing, to a network entity, one or more notifications of capability information for monitoring one or more of: the stationarity condition or the non-stationarity condition;
obtaining, from the network entity, configuration information for configuring at least one of: stationarity condition monitoring, non-stationarity condition monitoring, or radio environment related measurement relaxation; and
configuring, as a network-assisted configuration, based on the configuration information obtained from the network entity, one or more of: the stationarity condition, the non-stationarity condition, or the relaxed radio environment related measurements.

17. The method of claim 16,
wherein the configuration information obtained from the network entity comprises an indication of a possibility that relaxation of radio environment related measurements will affect one or more of: intra frequency cells, inter-frequency cells, inter-radio access technology cells, or dedicated cells, or
wherein the network-assisted configuration comprises configuring allowance or prohibition of switching by the terminal entity to the power saving mode depending on a parameter.

18. An apparatus comprising,
at least one processor; and
at least one memory comprising instructions stored therein that, when executed with the at least one processor, cause the apparatus to perform at least the following:
operating in a normal power mode by at least performing normal radio environment related measurements and monitoring a stationarity condition by at least one of: a local procedure or a local equipment;
in an instance in which the stationarity condition being monitored locally is satisfied, switching from the normal power mode to a power saving mode; and
operating in the power saving mode by at least performing relaxed radio environment related measurements,
wherein the stationarity condition being monitored locally is set by network-assisted configuration, or
wherein the relaxed radio environment related measurements are set by network-assisted configuration.

19. The apparatus of claim 18, wherein the instructions stored in the at least one memory, when executed with the at least one processor, further cause the apparatus to perform:
monitoring a non-stationarity condition with at least one of: a local procedure or a local equipment; and
in an instance in which the non-stationarity condition being monitored locally is satisfied, switching from the power saving mode to the normal power mode.

20. The apparatus of claim 18, wherein the stationarity condition is determined to be satisfied by at least monitoring, for a predetermined time period, for one of:
an absence of motion of the apparatus, or
an absence of motion of the apparatus and a non-variation of at least one of: a radio environment of the apparatus or an operating status of the apparatus.

21. The apparatus of claim 20, wherein the predetermined time period for monitoring the stationarity condition is set with network-assisted configuration.

22. The apparatus of claim 20, wherein the predetermined time period for monitoring for the stationarity condition is set depending on at least one of: a location of the apparatus, or a radio resource control state of the apparatus, or a daytime-related operating mode of the apparatus.

23. The apparatus of claim 19, wherein the non-stationarity condition is determined to be satisfied by at least monitoring for one of:
a presence of motion of the apparatus, or
a variation of at least one of: a radio environment of the apparatus or an operating status of the apparatus.

24. The apparatus of claim 18, wherein a non-stationarity condition being monitored for locally is set with network-assisted configuration.

25. The apparatus of claim 20, wherein either:
the apparatus further comprises a sensor comprising one or more of: a motion sensor, a positioning sensor, a gyroscope sensor, or an accelerometer sensor, such that the absence or presence of motion of the apparatus is monitored using the sensor, or
at least one of: the variation of radio environment of the apparatus the operating status of the apparatus, is monitored with a measuring procedure, wherein the measuring procedure comprises one or more of:
such as one or more of measuring a camping cell, measuring a serving cell, measuring one or more neighboring cells, measuring one or more candidate cells, measuring a received power of a reference signal, measuring a received quality of a reference signal, measuring a signal-to-noise ratio of a reference signal, or measuring a signal-to-interference-plus-noise ratio of a reference signal.

26. The apparatus of claim 18, wherein the relaxed radio environment related measurements are reduced in terms of at least one of: a scope as compared with the normal radio environment related measurements or a rate as compared with the normal radio environment related measurements.

27. The apparatus of claim 18, wherein the radio environment related measurements in the power saving mode are relaxed with respect to the radio environment related measurements in the normal power mode with regard to at least one of: a reduced number of cells to be searched, a reduced number of cells to be measured, a reduced measurement frequency, an increased measurement periodicity, a reduced reducing-measurement duration, or a reduced measurement accuracy.

28. The apparatus of claim 18, wherein the radio environment related measurements comprise at least one of: radio resource management measurements or cell search measurements.

29. The apparatus of claim 28, wherein at least one of:
regular radio resource management measurements are performed in the normal power mode and relaxed radio resource management measurements are performed in the power saving mode, or regular cell search measurements are performed in the normal power mode and relaxed cell search measurements are performed in the power saving mode.

30. The apparatus of claim 26, wherein the relaxed radio environment related measurements are set depending on at least one of: a location of the apparatus, a radio resource control state of the apparatus, or a daytime-related operating mode of the apparatus.

31. The apparatus of claim 26,
wherein a timing of the radio environment related measurements in the power saving mode is selected to be aligned with at least one of: discontinuous reception or paging cycles, or
wherein a periodicity of the radio environment related measurements in the power saving mode is set to infinity.

32. The apparatus of claim 18, wherein the instructions stored in the at least one memory, when executed by the at least one processor, further cause the apparatus to perform:
holding a radio context of the apparatus when operating in the normal power mode or holding a radio context history for predetermined locations; and
referring to the radio context being held or the radio context history for at least one of: stationarity condition monitoring, non-stationarity condition monitoring, or radio environment related measurement relaxation.

33. The apparatus of claim 19, wherein the instructions stored in the at least one memory, when executed by the at least one processor, further cause the apparatus to perform:
providing, to a network entity, one or more notifications comprising notifying capability information for monitoring the stationarity condition or the non-stationarity condition;
obtaining, from the network entity, configuration information for configuring at least one of: stationarity condition monitoring, non-stationarity condition monitoring, or radio environment related measurement relaxation; and
configuring, as network-assisted configuration, based on the configuration information obtained from the network entity, one or more of: the stationarity condition, the non-stationarity condition, or the relaxed radio environment related measurements.

34. The apparatus of claim 33,
wherein the configuration information comprises an indication of a possibility that relaxation of radio environment related measurements will affect one or more of: intra-frequency cells, inter-frequency cells, inter-radio access technology cells, or dedicated cells, or
wherein the network-assisted configuration comprises configuring allowance or prohibition of switching to the power saving mode depending on a parameter of the apparatus.

35. A non-transitory computer-readable storage medium comprising computer program codes stored therein which, when executed by at least one processor of a terminal entity, cause the terminal entity to perform at least:
operating in a normal power mode by at least performing normal radio environment related measurements and monitoring for a stationarity condition with at least one of: a local procedure or a local equipment;
switching from the normal power mode to a power saving mode, if the locally monitored stationarity condition is satisfied; and
operating in the power saving mode, including performing relaxed radio environment related measurements,
wherein the stationarity condition being monitored is set by network-assisted configuration, or
wherein the relaxed radio environment related measurements are set by network-assisted configuration.

* * * * *